Dec. 9, 1969 SHIN MAKI ETAL 3,482,653

SHOCK ABSORBING DEVICE

Filed June 15, 1967 8 Sheets-Sheet 3

Fig. 6
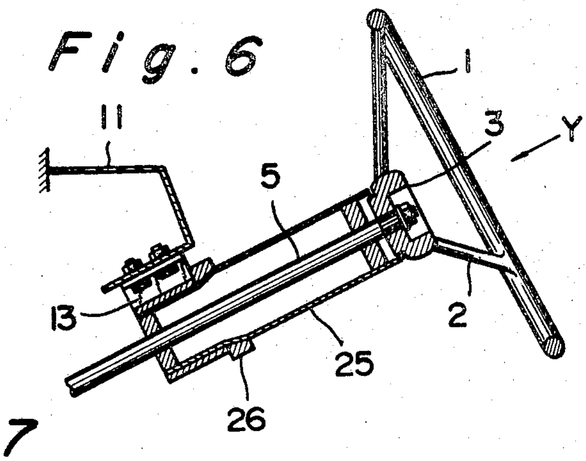
Fig. 7
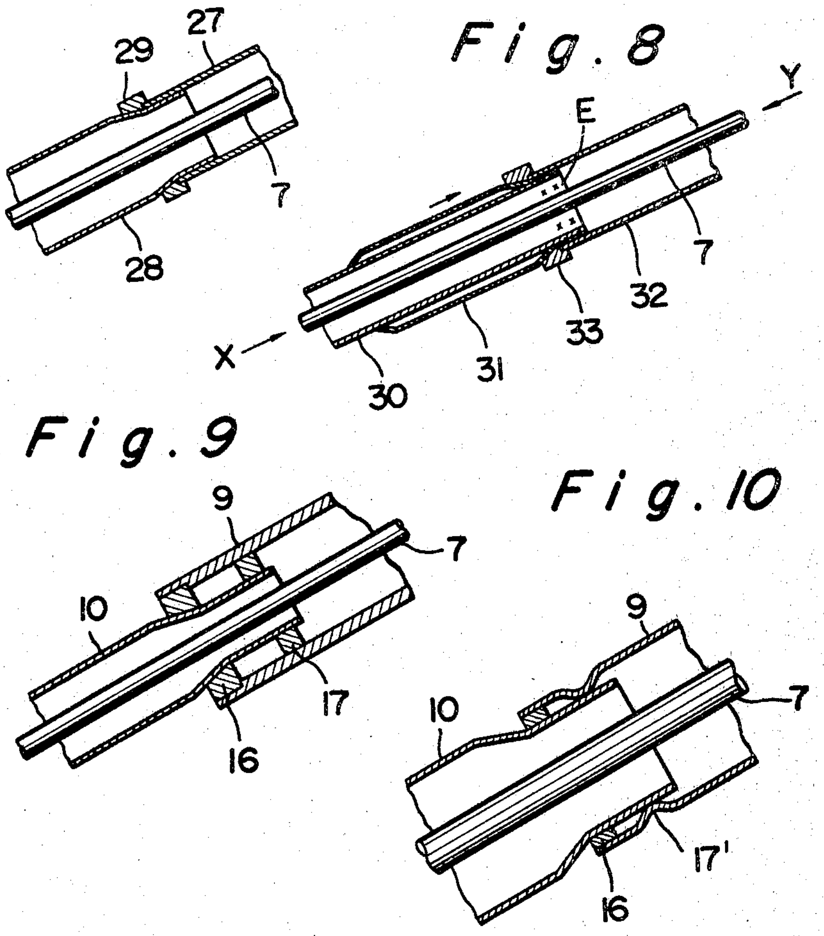
Fig. 7, Fig. 8, Fig. 9, Fig. 10

United States Patent Office 3,482,653

Patented Dec. 9, 1969

3,482,653

SHOCK ABSORBING DEVICE

Shin Maki, Tokyo, Yoshihiro Nishimura, Kamakura, and Akihiko Fujiki, Yokohama, Japan, assignors to Nissan Jidosha Kabushiki Kaisha, Kanagawa-ku, Yokohama, Japan Filed June 15, 1967, Ser. No. 646,385
Claims priority, application Japan, Aug. 25, 1966, 41/55,532; Oct. 8, 1966, 41/65,919
Int. Cl. F16d *7/00;* B62d *1/18*
U.S. Cl. 188—1 12 Claims

ABSTRACT OF THE DISCLOSURE

A device for absorbing shock energy, comprising an outer cylinder, a die secured to said outer cylinder, and a shaft having a thin portion fitted in said die and a thick portion, said outer cylinder and said shaft being movable relative to each other in the axial direction thereof, thereby upon application of a shock in the axial direction, the energy of the shock is damped by plastic deformation due to contraction of the thick portion of the shaft by the die.

This invention relates to a shock absorbing device, more particularly to a shock absorbing device suitable for mounting on the bumper or the steering shaft of a vehicle, especially an automobile, for minimizing damage on the vehicle due to collision, and thereby ensuring safety of a driver and passengers in the vehicle.

A known shock absorbing device for damping impact due to vehicle collision comprises a bumper secured to the body or chassis of the vehicle by means of stay members made of spring steel and secured to both the bumper and the vehicle. Such conventional shock absorbing device has a disadvantage in that the total energy absorbed thereby is small because the spring steel produces a repulsive force. Accordingly, unless such impact energy is damped not by an elastic means but by plastic deformation of material, it is impossible to absorb the primary shock of the collision as well as the secondary effects caused by the reaction of the primary shock, such as injury of the driver by thrusting of the steering shaft.

There have been proposed a number of devices for absorbing shock energy at the time of collision by means of plastic deformation of material, but known devices have disadvantages in that they are complicated and expensive, or they lack reliability in shock absorbing action. For instance, an energy dissipater comprising a hollow member of honeycomb structure is too complicated for practical application, and an energy absorber comprising a tube, which is rolled after being expanded and divided by a roller, as disclosed in U.S. Patent No. 3,236,333, is bulky and expensive. Shock absorbers using tension or compression of material have also been proposed, but the former have an inferior reliability of energy absorption due to the possibility of breakage of the material, while the latter has a disadvantage in that the maximum allowable level of the impact loading is limited due to the possibility of buckling.

Therefore, an object of the present invention is to obviate the aforesaid disadvantages of conventional shock absorbers by providing a novel shock absorbing device comprising an outer cylinder, a die secured to said outer cylinder, and a shaft having a thin portion fitted in said die and a thick portion. The outer cylinder and the shaft are movable relative to each other in the axial direction, whereby upon application of a shock in the axial direction, the energy of the shock is damped by plastic deformation due to contraction of the thick portion of the shaft by the die. According to the shock absorbing device of the invention, the shaft is contracted by plastic deformation thereof by means of the die, and hence, the load for initiating the contraction of the shaft is substantially constant. At the same time, the load during the plastic deformation is also maintained practically constant.

Such operative characteristics of the device are particularly advantageous for energy absorption.

Another object of the invention is to provide a shock absorbing device deformable by a small force and yet capable of absorbing a large amount of shock energy.

A further object of the present invention is to provide a shock absorbing device suitable for mounting on the bumper or steering shaft of a vehicle comprising aforesaid construction, which can be easily manufactured at a low cost.

It is an object of the present invention to provide a shock absorbing device usable for improving safety of the bumper or a steering shaft of an automobile or the like.

For a better understanding of the invention, reference is made to the accompanying drawings, in which:

FIG. 2 is a graph showing the relation between the load and the displacement of a movable member of the shock absorbing device according to the present invention;

FIGS. 3 to 6 are diagrammatic illustrations of four embodiments of the shock absorbing device of the invention, shown as applied to the steering shaft of an automobile;

FIGS. 7 to 12 are fragmental sectional views illustrating various modifications of the shock absorbing device of the present invention as applied to an automobile steering shaft;

Figure 1:
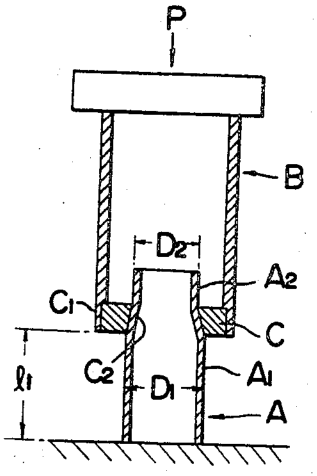
FIG. 1 is a sectional view of a shock absorbing device according to the present invention.

Referring to FIG. 1, illustrating the operative principle of the shock absorbing device of the present invention, A is an inner shaft and B is an outer cylinder axially aligned with the shaft A so as to be movable relative to the shaft A in the axial direction. In the illustrated embodiment, the inner shaft A is a pipe, but it can be a solid cylinder. The inner shaft A is made of soft steel, aluminum, or synthetic resins, and it comprises a thick portion $A_1$ having a large diameter $D_1$ and a thin portion $A_2$ having a small diameter $D_2$ slightly smaller than $D_1$. A rigid die C is secured by press-fitting or welding at one end of the outer cylinder B in such a manner that the die should not move relative to the outer cylinder B when an axial shock is applied thereto. Accordingly, the outer periphery $C_1$ of the die is tightly attached to the inner surface of the outer cylinder B, and an inner opening $C_2$ is provided a taper portion located at the central portion of the die so that the thin portion $A_2$ of the inner shaft may be fitted therein.

Figure 1A:
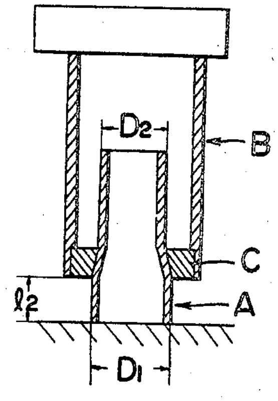
FIG. 1A is a view similar to FIG. 1, showing the shock absorbing device after being contracted for absorbing shock energy responsive to a shock applied thereto.

In the shock absorbing device of the aforesaid construction, if a compressive load P due to a shock is applied thereto, the thick portion $A_1$ of the inner shaft A is contracted by means of the inner opening $C_2$ of the die C, and the diameter $D_1$ and the length $l_1$ of the thick portion are reduced to $D_2$ and $l_2$ respectively as shown in FIG. 1A. Thus, the energy of shock or impulse applied to the device is absorbed by such contraction of the inner shaft A of the shock absorbing device.

A suitable relation between the diameters $D_1$ and $D_2$ or the contraction ratio as defined by $$\frac{D_1-D_2}{D_1}$$

can be determined upon selection of related design conditions including the load for starting the contraction. Such contraction ratio is a function of the properties of material for the inner shaft A and the physical dimensions thereof. In the embodiment as shown in FIG. 1, the contraction is made by extrusion, and the elastic resistance of the opening portion of the die affects the loading conditions on the inner shaft A to a greater extent than in the case of contraction by drawing. As a result of various tests made by the inventors, the approximate value of load P for starting substantial contraction of the inner shaft A consisting of a pipe, or the load for the point *b* of a load-displacement curve of FIG. 2, can be determined as ⅓ of the product of the yielding stress of the material of the pipe and the effective cross sectional area of the pipe being contracted, which effective cross sectional area is given by the (area determined by the outer diameter) minus the (area determined by the inner diameter), provided that the contraction ratio is a few percents.

Figures 2, 3:
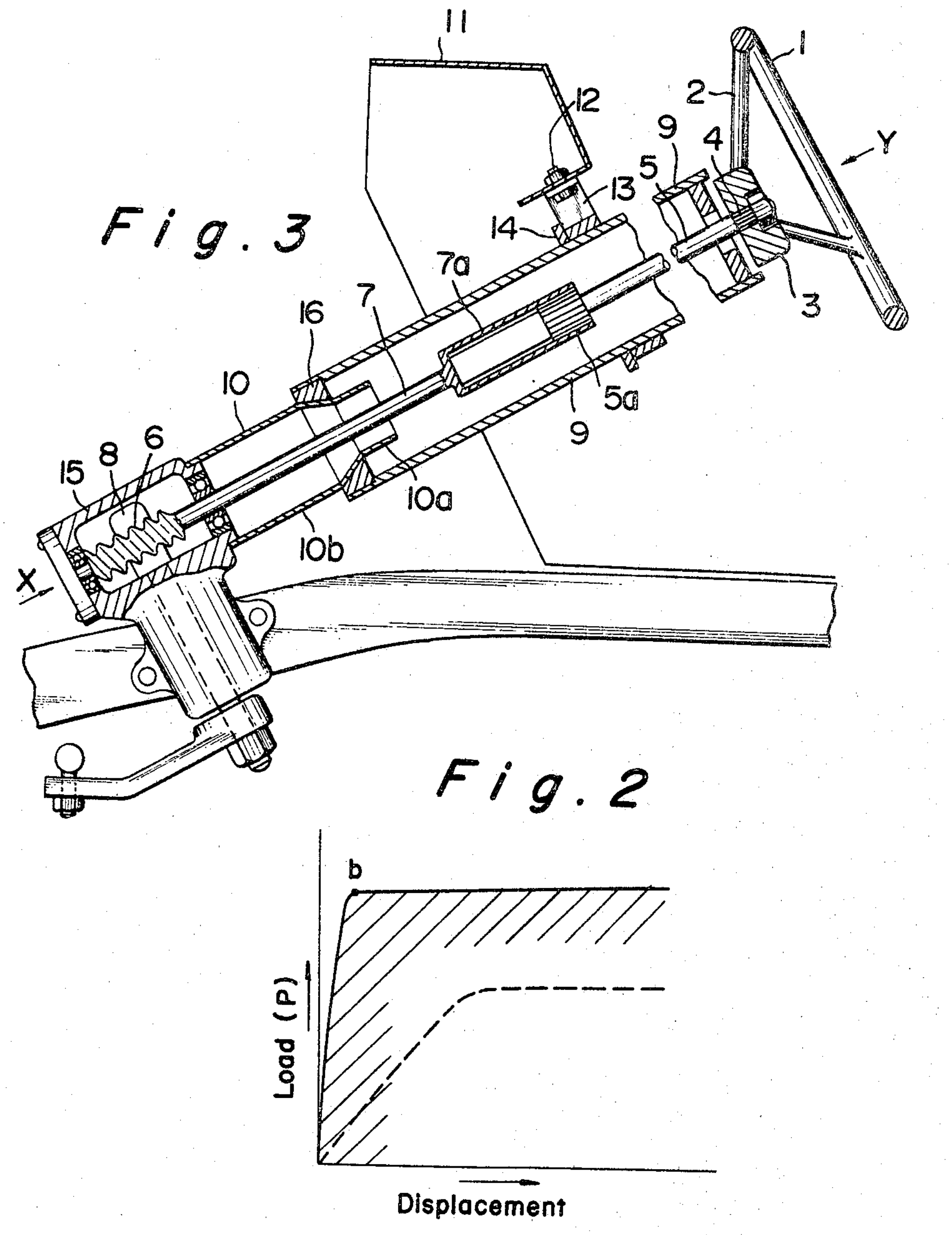

The inventors have noticed the fact that the load for starting substantial displacement of the die C relative to the inner shaft A is approximately constant, and that the load is kept constant after the substantial displacement of the die is started, and that such constant load is particularly advantageous for absorption of energy. In other words, the device of FIG. 1 has advantages in that the total energy to be absorbed thereby, which is represented by the area under the solid lines of FIG. 2, is large, and that the load for starting the displacement, which corresponds to the load for the point *b* of the solid line of FIG. 2, can be selected at will. For instance, if a small contraction ratio is selected, the load-displacement characteristics as shown by a dotted line in FIG. 2 can be used. Thus, the designer of such shock absorber can have a considerably wide freedom in selecting load-displacement characteristics of the device.

Application of the shock absorbing device of the present invention to the steering shaft of an automobile will now be described.

Generally speaking, a steering shaft should preferably be shrinkable at an intermediate point thereof for absorbing shock energy applied thereto from either upper or lower end thereof. In a spring is used for absorbing such energy, there is a disadvantage in that reaction of the spring to such shock after the absorption of the energy causes destructive effects to the steering shaft. The shock absorbing device according to the present invention, however, uses plastic deformation of the inner shaft A thereof, and there is no danger of reactive force such as that of a spring.

FIGS. 3 to 12 show various steering shafts equipped with the shock absorbing device of the present invention, in which similar parts are represented by similar reference numerals and symbols. By means of a steering wheel 1 supported by arms 2, a steering force is delivered to a steering head 3. An upper steering shaft 5 is engaged with the steering head 3 by a serration 4 for transferring the steering force from the head to a gear box 15 through a lower steering shaft 7. A worm gear 6 in the gear box 15 is integrally formed at the lower end of the lower steering shaft 7. According to the present invention, the total effective length of the upper and the lower steering shafts between the head 3 and the worm 6 is designed to be shortened for safety at an intermediate point thereof upon application of a shock thereon in the axial direction.

In the particular embodiment as shown in FIG. 3, the lower end of the upper steering shaft 5 is provided with a splined portion **5*a* integrally attached thereto, while the upper end of the lower steering shaft 7 is provided with a splined hollow cylinder 7*a* integrally mounted thereto. The splined portion 5*a* is slidable in the axial direction within the splined box 7*a* and to transmit rotation of the upper shaft to the lower shaft through the engagement between the splined portion 5*a* and the splined cylinder 7*a*. The worm 6 at the lower end of the lower steering shaft 7 transfers the rotary steering force to a roller 8 at a reduced speed through the engagement between the worm 6 and the roller 8 disposed at right angles to the worm. If a shock is applied to the steering shafts in X or Y directions as shown in FIG. 3, the splined portion 5*a* slides down along the splined cylinder 7*a*** in the axial direction thereof to effect shortening of the total length of the upper and the lower steering shafts.

Cylinders 9 and 10 for supporting steering shafts should withstand against bending mount and other non-rotary forces acting on the cylinders except for steering forces generated by the steering wheel 1. In the embodiment of FIG. 3, the cylinder for steering shafts is divided into two portions, namely the upper cylinder 9 having a die 16 secured thereto and a lower cylinder 10 partially engaged with an opening of said die 16. The upper cylinder 9, the lower cylinder 10, and the die 16 respectively correspond to the outer cylinder B, the inner shaft A, and the die C of FIG. 1, and shock energy is absorbed by plastic deformation of the lower cylinder 10. More particularly, the lower cylinder 10 for the steering shafts comprises a thin portion **10*a* fitted in the opening of the die 16 and a thick portion 10*b* to be contracted by the die 16. The thick portion 10*b*** should be long enough in the axial direction so as to absorb reasonably large amount of shock energy during contracting stroke thereof.

The upper cylinder 9 for the steering shafts is supported by a bracket 13 secured to the front structure 11 of the automobile by suitable means, such as a bolt. There is usually mounted a panel for various meters on the front structure. The mechanical connection between the bracket 13 and the upper cylinder 9 is such that upon occurrence of a shock in the Y direction as shown in FIG. 3, the cylinder 9 can be moved relative to the bracket 13, while upon occurrence of a shock in the X direction as shown in the figure in the cylinder 9 cannot be moved relative to the bracket 13 by means of the blocking with a lug 14 secured to the cylinder 9. The lower cylinder 10 for the steering shafts is fixed to the steering gear box 15 at the lower end thereof, while the upper end of the lower cylinder 10 is fitted in die 16 integrally secured to the lower end of the upper cylinder 9 for the steering shafts.

Let it be supposed that the automobile on which the shock absorbing device is mounted is collided, and a driver of the automobile is urged forwards by acceleration subsequent to the collision, then a shock in Y-direction is applied to the steering wheel 1, and the upper steering shaft moves downwards by forcing the splined portion **5*a* to slide down along the splined cylinder 7*a* to shorten the total length of the upper and lower steering shafts 5 and 7. At the same time, the total length of the upper and lower cylinders 9 and 10** for the steering shafts are virtually reduced while absorbing the shock energy in the aforesaid manner. According to the experiments carried out by the inventor, the aforesaid shortening is started when the Y-direction load is about 500 to 1,000 kg., and the shock energy due to collision can be absorbed in 5/100 to 6/100 second.

If the front end of the automobile is forced rearwards by collision, an X-direction shock is applied to the steering shafts, and both the shafts 5, 7 and the cylinders 9, 10 therefor are shortened in the same manner as the Y-direction shock. In this case, thanks to the lug 14 secured to the upper cylinder 9, the upper cylinder 9 does not move relative to the bracket 13, and accordingly, the movement of the steering wheel 1 towards the driver is effectively prevented.

FIG. 9 shows a modification of the preceding shock absorbing device according to the present invention, which is particularly suitable for steering shafts frequently subjected to bending moment. It is difficult to withstand against such frequent bending moment by only one die 16. In the modification of FIG. 9, an additional bracket 17 is inserted between the upper cylinder 9 and the inserted portion of the lower cylinder 10, so that bending moment between the upper and the lower cylinders is supported at two points. Thus, the strength of the shock absorbing device against bending moment is considerably improved.

Figure 11:
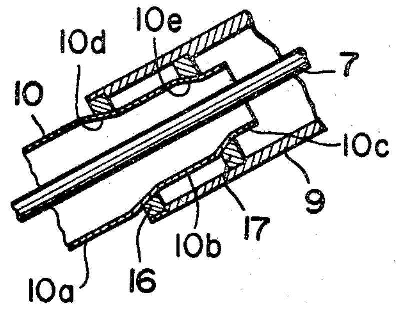

FIG. 11 shows a plastically deformable shock absorbing device according to one embodiment of the invention. The hollow shaft 10 of substantially uniform thickness provides a larger diameter portion or initial cylindrical portion 10*a* having diameter $D_1$, a small diameter portion 10*b* having diameter $D_2$ and a smallest diameter portion 10*c* having diameter $D_3$, and gradually tapered transition portions 10*d* and 10*e* respectively to be initially received by spaced dies 16 and 17 secured coaxially in the outer cylinder 9 as shown, the shock absorbing device is aligned without other parts, and can be handled as one unit. The cross sectional areas of the material at the dies 16 and 17 are determined respectively such that the initial contracting load is substantially one-third the product of effective cross sectional areas and yielding stress of the material of the shaft, and the contraction ratios
and $$\frac{D_1-D_2}{D_1}$$

$$\frac{D_2-D_3}{D_2}$$

are determined to not exceed ten percent. By determining the load and contraction ratio within the above mentioned rather low range, simple dies can be applied to relatively low load shock absorbing device to attain a constant load displacement characteristic value when the shaft 10 is forced through the dies 16 and 17.

FIG. 10 shows a further modification of the device of FIG. 9, in which the additional bracket 17 is replaced by an annular ridge 17′ formed on the upper cylinder 9 so as to be kept in direct contact with the inserted portion of the lower cylinder 10.

Figure 12:
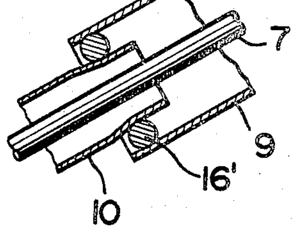
Figure 13:
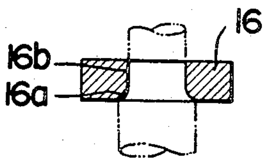
FIG. 13 is a diagrammatic illustration of a die usable in the shock absorbing device according to the present invention.
Figure 24:
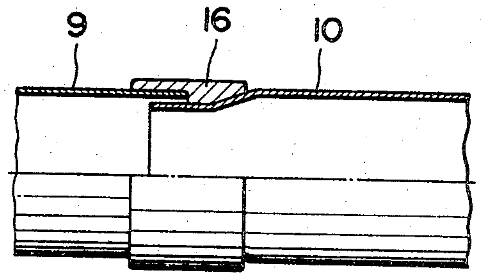
Figure 25:
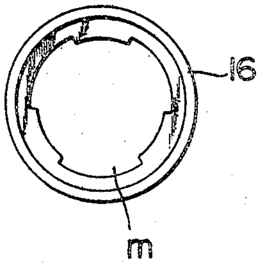

As shown in FIG. 13, it is preferable to form the contracting openings of the die 16 in two portions consisting of a cylindrical portion 16*b* and a rounded end portion 16*a* for receiving the inner shaft. In some applications, a doughnut-shaped die 16′ as shown in FIG. 12 can be used with advantage. For providing dimensional allowance to the die 16 and the inner cylinder 10 to facilitate the manufacture and processing thereof, it is permissible to form a plurality of notches *m* in the shaping surface of a die 16, as shown in FIG. 25. FIG. 24 is a longitudinal sectional view of an embodiment of the invention using the die of FIG. 25.

Figure 26:
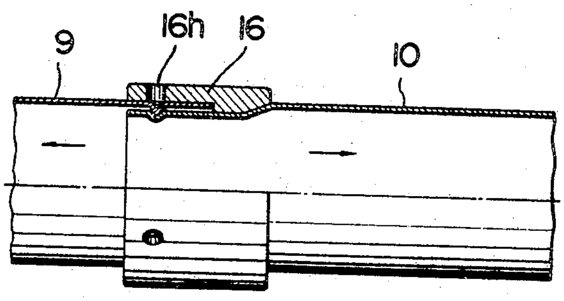
Figure 27:
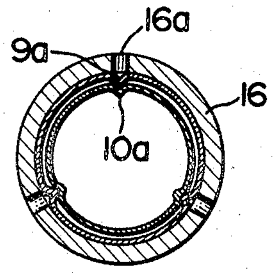

In certain applications, it is preferable to keep the inner shaft or inner cylinder 10 in register with the outer cylinder 9 once they are assembled. In an embodiment of the present invention as illustrated in FIG. 26 and FIG. 27, a die 16 is secured at one end of the outer cylinder 9 so as to surround the peripheral surface of the cylinder 9. There are provided one or more pin holes 16*h* on the periphery of the die in radial directions, so that after the inner cylinder 10 is inserted into the opening of the die 16 in alignment with the outer cylinder 9, dowels 9*a* and 10*a* can be formed on the overlapping portion of the cylinders 9 and 10 by applying a punching rod through the small hole 16*a*. The dowels 9*a* and 10*a* thus formed act not only to keep the inner and outer cylinders in alignment but also to reinforce the assembly thereof against bending moment applied across the joining portion of the inner and outer cylinders.

Figure 28:
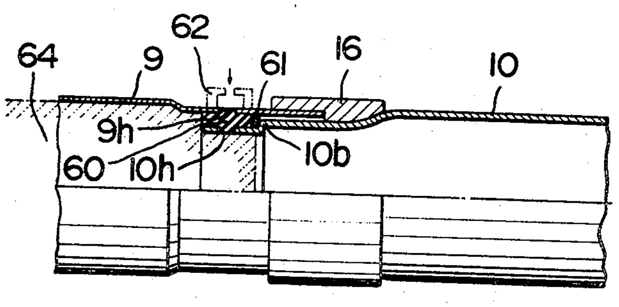
FIGS. 24 to 29 are schematic illustrations of different embodiments of the shock absorbing device according to the present invention.
Figure 29:
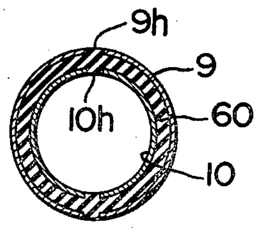

FIGS. 28 and 29 show another embodiment of the invention, in which the space between the laminated portions of a inner and outer cylinders 9 and 10 is filled with a suitable resin 60 so as to ensure that the inserted portion of the inner cylinder 10 is kept in register with the outer cylinder 9. To facilitate such filling of the resin, it is preferable to bore one or more small holes 9*h* on the periphery of the outer cylinder 9 in the proximity of a die 16 secured thereto. In order to provide tight and durable contact between the inserted portion of the inner cylinder 10 and the resin thus filled, one or more small holes 10*h* may be bored on the periphery of the inner cylinder 10 at the inserted portion thereof within the outer cylinder 9. In the particular embodiment shown in FIG. 28, the end portion of the inner cylinder 10 is radially contracted so as to receive an annular end ring 61 at the step portion 10*b* between thus contracted portion and the non-contracted portion. For filling the resin 60 between the inner and outer cylinders, one may use a combination of an inner mould 64 adapted to block out both the holes 10*h* and an annular opening at the tip end of the inner cylinder 10 and a removable pouring basin 62. It is apparent that the resin 60 thus moulded into the space between the cylinders 9 and 10 acts not only to keep one cylinder in register with the other but also to give extra strength to the assembly of the two cylinders against bending moment applied thereto.

Figures 4, 5:
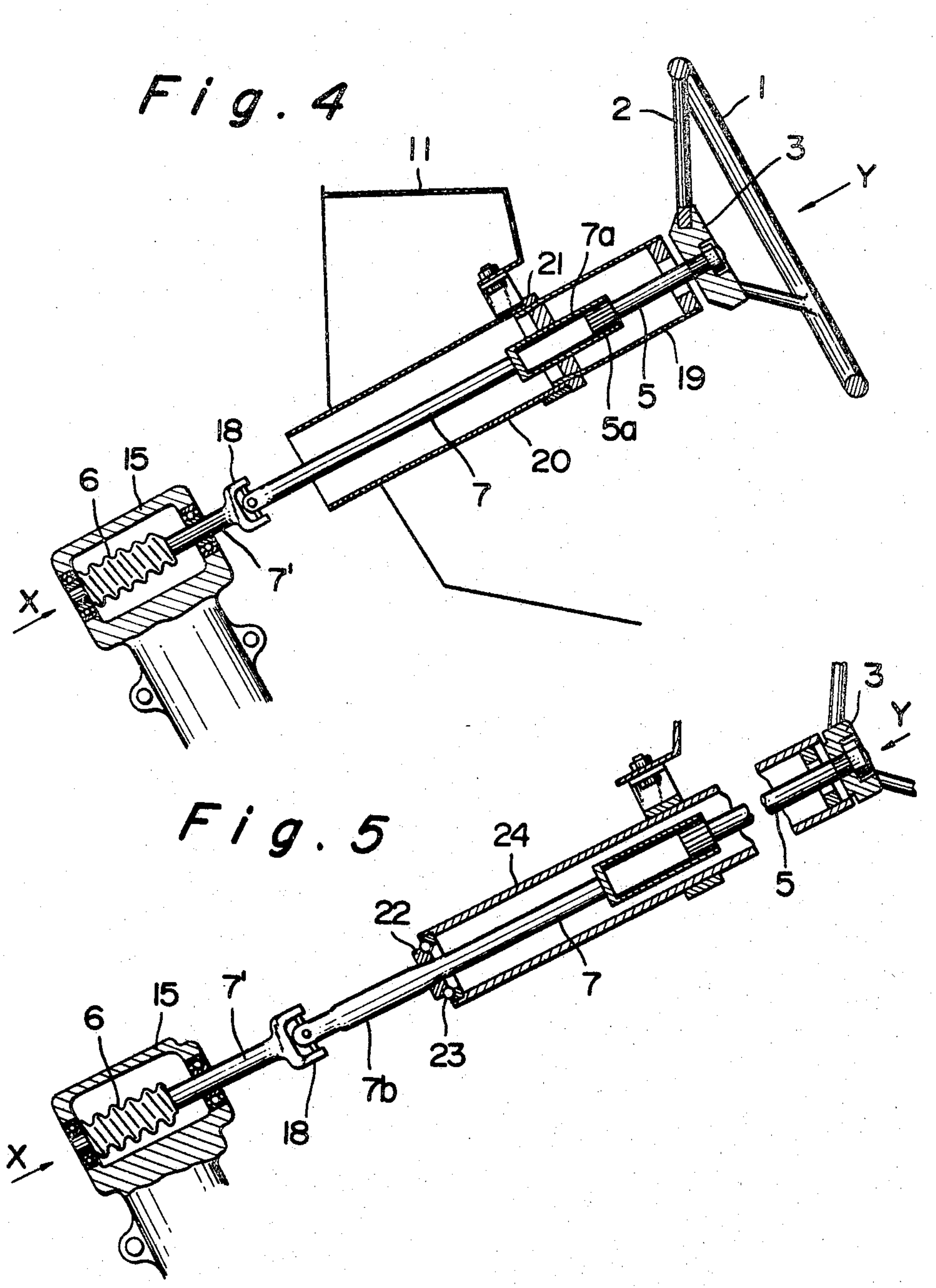

FIG. 4 shows another embodiment of the shock absorbing device according to the present invention; which is used in conjunction with a steering shaft 7 having a universal joint 18 inserted at a intermediate point thereof. In this embodiment, the lower steering shaft 7 is divided into two portions, namely a main portion 7 and a lower end portion 7′ connected to the main portion through the universal joint 18. Such construction of the steering shaft is utilized when the shaft 7 cannot be disposed straight due to either convenience for assembly of or particular angular relationship between the angular disposition of a steering wheel 1 secured to the automobile body and the position of the steering gear box 15 on the automobile chassis. In this embodiment, if a Y-direction shock is applied thereto, the total length of an upper steering shaft 5 and the lower steering shaft 7 is shortened by means of sliding of a splined portion 5*a* of the upper steering shaft 5 within a splined cyilnder 7*a* at the upper end of the lower steering cylinder in the same manner as the preceding embodiment described hereinbefore referring to FIG. 3. A die 21 of the embodiment of FIG. 4 is secured to the upper edge of the lower cylinder 20 so as to contract an upper cylinder 19 upon the aforesaid shortening and to absorb energy of the shock by plastic deformation of the upper cylinder 19 by means of the die 21.

FIG. 5 shows an embodiment of the shock absorbing device according to the present invention, in which an expanded portion 7*b* of a lower steering shaft 7 is adapted to be contracted by a die 22 for the purpose of shock energy absorption. In this embodiment, the lower end of a cylinder 24 for the steering cylinder is provided with a ball or roller bearing to support the lower portion of the steering shaft 7, and the inner race of the ball or roller bearing is made of a die 22. Upon occurrence of a shock in either X or Y direction, the expanded portion 7*b* of the steering shaft 7 moves relative to the cylinder 24, so that the expanded portion *7b* is contracted by the die 22 for absorbing shock energy by the plastic deformation thereof.

In an embodiment shown in FIG. 6, a cylinder 25 for supporting a steering shaft is fitted in a bracket 13 secured to the structural plate 11 of the body of an automobile. The bondage between the structural plate 11 and the bracket 13 is so strong that upon occurrence of a Y-direction shock on a steering wheel 1, the cylinder 25 is contracted by means of a die 26 secured to the bracket 13, as shown in FIG. 6.

FIG. 7 shows another embodiment of the invention, in which the inserted portion of a lower cylinder 28 is kept in tight contact with the inner surface of an upper cylinder 27, so that any bending moment acting on the cylinders can be borne by the tight contact between the two cylinders. In this embodiment, the lower cylinder 28 is contracted by a die 29 in such a manner that the contracted portion thereof is compressed by the upper cylinder 27, and accordingly, the resistance for deformation is larger than ordinary deformation by drawing process.

In an embodiment illustrated in FIG. 8, a cylinder is deformed by drawing rather than extrusion. A compressible cylinder 31 is integrally connected to a lower cylinder 30 at the upper end E thereof. Upon occurrence of a shock in the axial direction of the steering shaft, the lower cylinder 30 moves relative to an upper cylinder 32, and the compressible cylinder is drawn from the end E thereof and contracted by a die 33 secured to the lower end of the upper cylinder 32.

The shock absorbing device according to the present invention can be also used in conjunction with an automobile bumper as illustrated in the following drawings. A known shock absorbing plate or a bumper has a stay member made of spring steel and bonded integrally thereto, and such plate or bumper is mounted to the front end or rear end of an automobile by securing the stay member to the body or chassis of the automobile. When the automobile collides with another automobile or hits a foreign matter or large mass, such shock absorbing plate or bumper absorbs the colliding or hitting shock to some extent for protection of the automobile. If the magnitude of such shock exceeds a certain predetermined limit, the stay member is deformed and the plate or bumper itself hits the automobile body and damages the body. Recent trend of designing automobiles, particularly passenger cars, is inclined to put more emphasis on the style or outlook of such bumper or stay member rather than its original function of absorbing mechanical shock due to collision or hitting. Accordingly, such bumper and stay member are easily deformed even by a slight contact with foreign body, and damages are caused on the automobile body.

Figure 21:
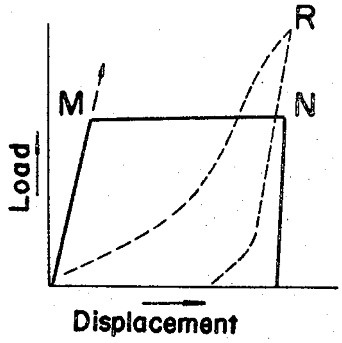
FIG. 21 is a graph showing the load-displacement characteristics of a shock absorbing device of the present invention as compared with that of a conventional shock absorber.

As a result of mechanical analysis of dynamics of automobile collision from behind, the inventor has found that the best load-displacement characteristics of the shock absorbing device should be as shown by a solid curve in FIG. 21. The position of the point M of the solid line curve should be determined in accordance with various design factors, such as the weight of a vehicle on which the shock absorbing device is going to be mounted and the limitation of the relative automobile speed to which the mechanical shock due to collision should be damped, etc.

A dotted line curve of FIG. 21 shows typical load-displacement characteristics of a known bumper having a spring steel stay member, in which the load is taken as a static load. With such known bumper, the shock energy once absorbed by the bumper is discharged upon removal of the load, and accordingly, the actual energy absorb by the shock absorbing device is the area encircled by the dotted line curve, which is small. Furthermore, the point R or the maximum load for such conventional bumper can be very high, as shown in FIG. 21, and such high load results in a large acceleration and a large mechanical shock to persons in the automobile. On the other hand, according to the present invention, the shock energy absorption is carried out by plastic deformation of material, and hence, a large amount of shock energy can be absorbed without causing break-down of material. In short, according to the present invention, the area encircled by the solid line curve of FIG. 21 is large for absorbing large shock energy, and the point N determining the largest possible acceleration is small, and hence, the mechanical shock to persons in the automobile is limited to a low level.

Figure 22:
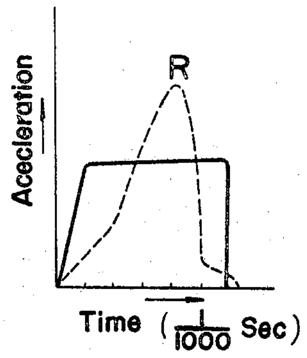
FIG. 22 is a graph illustrating acceleration-time characteristics of a shock absorbing device of the present invention as compared with that of a conventional shock absorber.

The inventor has calculated and measured acceleration of an automobile in the longitudinal direction thereon when it is collided from behind, and the results are shown in FIG. 22. If a suitable shock absorber is provided so as to achieve a time-acceleration characteristics as shown by a solid line in the figure, the highest acceleration of an automobile due to collision is minimized to ensure safety of persons in the automobile, and at the same time the shock energy is absorbed to the maximum for minimizing damages on the automobile body. As a result of such calculation and tests, it was found preferable to use a shock absorbing deivce having load-displacement characteristics as shown by a solid line in FIG. 21. To achieve such load-displacement characteristics, the inventor found that contraction of a shaft by means of a die can be most advantageously used for producing such load-displacement characteristics. FIGS. 14 to 20 show various forms the shock absorbing device according to the present invention.

In order to raise automobile, such as for replacing a tire, jacks are often inserted between the bumper and the load surface. Accordingly the bumper should be strong enough to withstand the weight of the automobile, and the stay member, especially joint portions thereof, must be made so study as to withstand any bending moment applied thereto during such raising of the automobile.

Figure 14:
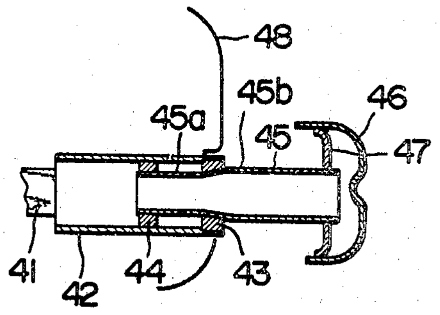
FIGS. 14 and 15 are respectively a schematic sectional view and schematic plan view of an embodiment of the present invention, as mounted on an automobile bumper.
Figure 15:
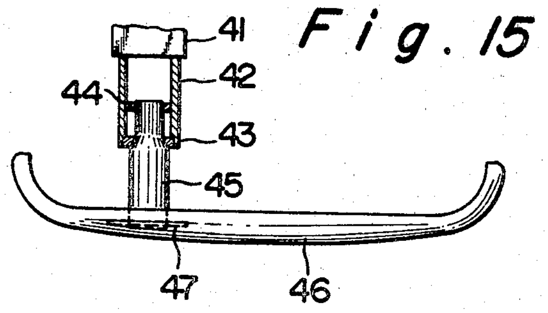
Figure 16:
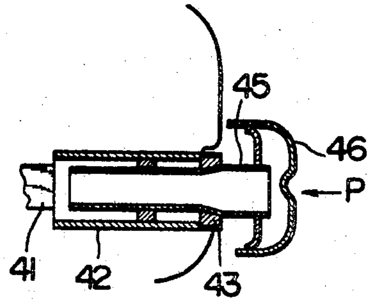
FIG. 16 is a schematic sectional view, illustrating the manner in which the device of FIG. 14 is contracted for impact energy absorption upon collision of automobiles.

Referring to FIGS. 14 to 16, an outer cylinder 42 is secured to the framework or chassis 41 of an automobile, and a die 43 is affixed to the opposite end of the outer cylinder 42. An inner cylinder 45 carried by an inner cylinder holder 47 secured to a bumper 46 is fitted in the die 43, and the tip end of the fitted portion of the inner cylinder is supported by a bearing 44 seated in the outer cylinder 42. More particularly, a thin portion 45*a* of the inner cylinder 45 extends into the outer cylinder 45 through the die 43, while a suitable length of thick portion 45*b* of the inner cylinder is held ready for contraction by the die upon occurrence of a shock. The length of the thick portion 45*b* determines the maximum stroke of the shock absorbing device for the operation of shock energy absorption, and an example of such length is about 50 mm. for an inner cylinder of 80 mm. dia. under certain conditions, as will be described hereinafter referring to mathematical analysis thereof.

Upon application of a shock load P on the bumper 46, the inner cylinder is forced into the outer cylinder, as shown in FIG. 16, and at the same time the thick portion 45*b* is contracted by the die 43 to absorb shock energy thereby.

Figure 17:
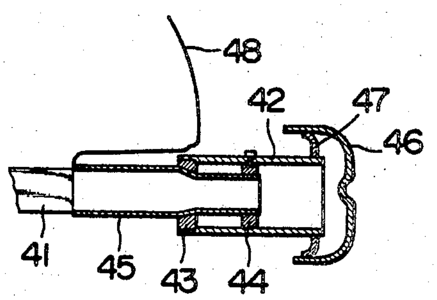
FIGS. 17 to 20 are diagrammatic illustrations of other embodiments of the present invention, as applied to automobile bumpers.
Figure 18:
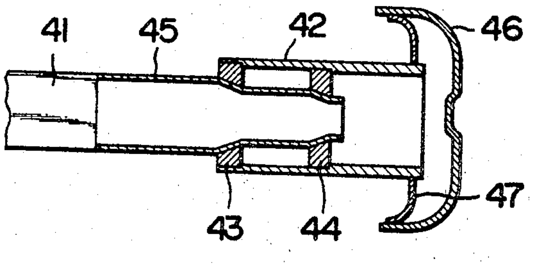
Figure 19:
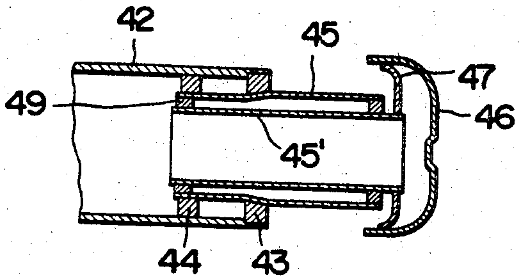
Figure 20:
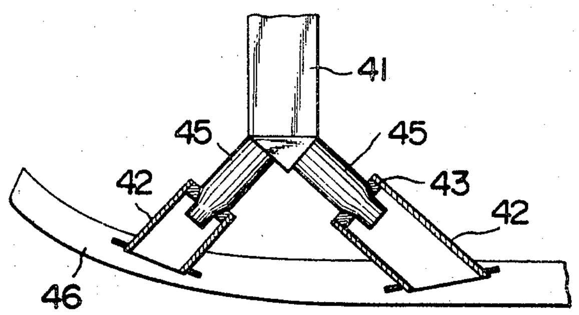

According to the present invention, it is possible to mount an outer cylinder on a bumper and an inner cylinder on an automobile chassis, as shown in FIG. 17. FIG. 18 shows a modification, in which an inner cylinder 45 is to be contracted at two positions simultaneously by a pair of dies 43 and 44. In order to prevent buckling of the inner cylinder 45, it is possible to add a reinforcing or guide cylinder 45' within an inner cylinder 45, as shown in FIG. 19. In this case, the guide cylinder 45' should preferably be bonded to the inner cylinder 45 to be contracted by a suitable bonding member 49. For damping effectively shocks applied slantwise, the shock absorbing device of the present invention can be mounted on an automobile with a suitable angle to the longitudinal direction of the automobile as shown in FIG. 20.

Figure 23:
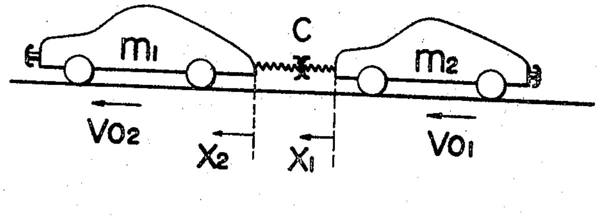
FIG. 23 is a diagrammatic illustration, showing various constants and variables for analyzing forces acting on two automobiles upon collision thereof.

The operation of the shock absorbing device of the present invention will now be analyzed mathematically. Referring to a model of FIG. 23, the equations of motion for two automobiles collided are as follows:

$$m_1\ddot{X}_1=-m_2\ddot{X}_2$$

$$m_1\ddot{X}_1=-C(X_1-X_2)$$

Here, $m_1$, $m_2$ are masses of the automobiles;

C is a composite spring constant of the rear bumper of the collided automobile and the front bumper of the colliding bumper;

$X_1$, $X_2$ are displacements of the automobiles as measured respectively from positions assumed at the moment of collision; and $\ddot{X}_1$, $\ddot{X}_2$ are second derivatives of the displacements $X_1$, $X_2$ with respect to time.

For simplicity, if it is assumed that the masses of the colliding and the collided automobiles are the same and the velocities of automobiles prior to collision are represented by $V_{o1}$ and $V_{o2}$ respectively, then one obtains the following solution of the aforesaid equations of motion.

$$\ddot{X}_2=a \sin \omega t$$

$$\dot{X}_2=V_{o2}+\frac{a}{\omega}(1-\cos \omega t)$$

$$X_2=\left(V_{o2}+\frac{a}{\omega}\right)t-\frac{a}{\omega_2}\sin \omega t$$

Here, $\dot{X}$ is the first derivative of $X_2$;

$$\omega=\sqrt{\frac{2C}{m}} \text{ and}$$

$$a=\frac{\omega}{2}(V_{o1}-V_{o2})$$

In the above formulae, if it is assumed that the mass of the automobile $m$ is 1 ton, the composite spring constant is 40 kg./mm. in the beginning and increased to 120 kg./mm. later, and the relative colliding speed ($V_{o1}-V_{o2}$) is 20 km./h., then the shock due to the collision turns out to be about 15G, G being the acceleration of gravity. It is generally believed that the maximum allowable rearward acceleration of the head of a person in the collided automobile should be less than 3G for safety. As a result of previous tests, it is known that about ½ to ¼ of the acceleration of automobile is transferred to the person therein. In view of the automobile acceleration immediately after the collision, the inventor has concluded that about 10 tons of energy should be absorbed in about 5/100 second in a stroke of less than about 50 mm. In the shock absorbing device of FIG. 1, if it is assumed that $D_1$=80 mm. and $D_2$=77.5 mm., then the load corresponding to the point M is of FIG. 21 turns out to be about 4 tons. In this case, if $D_2$ is reduced to 76 mm., the aforesaid becomes about 7 tons.

By selecting a proper contraction ratio $$\frac{D_1-D_2}{D_1}$$

and by choosing a suitable large diameter $D_1$ and a suitable thickness of the metal plate of the cylinder to be contracted, various operative characteristics can be obtained in the embodiment of the shock absorbing device of the invention as shown in FIG. 1. Thus, such shock absorbing device can be used in various kinds of vehicles.

It is apparent for those skilled in the art that the shock absorbing device of the present invention can be used repeatedly by replacing the inner shaft after it is deformed for shock absorption, and the cost of the replacement and the cost for replacing operation are both very low. Thus, the shock absorbing device according to the present invention can be mounted and maintained at a reasonably low cost.

Furthermore, according to the present invention, the load displacement characteristics of the shock absorbing device are very stable and the duration of the energy absorption can be adjusted by selecting proper material and dimension of the inner rod to be contracted, because the shock energy is absorbed by converting it into dynamic frictional force between a die and a contractible pipe or bar and into force for changing atomic or molecular arrangement of the convertible pipe or rod by means of plastic deformation thereof by extrusion or drawing the pipe or rod through a die hole.

What we claim is:

1. A shock absorbing device for absorbing shock energy by plastic deformation of at least one member of the device comprising: a hollow shaft of substantially uniform thickness and having a reduced diameter portion ($D_2$), a larger diameter portion ($D_1$), and a gradually tapered transition portion between said reduced and larger diameter portions, an outer cylinder axially aligned with said shaft and movably connected longitudinally to said shaft, a first die secured to one end of said outer cylinder so as to receive therein said reduced diameter portion and to engage said transition portion of the shaft, said larger diameter portion of said shaft having a substantially uniform cross sectional area, a smallest diameter portion ($D_3$) mounted on one end of the shaft, a second gradually tapered transition portion between said smallest and said reduced diameter portions, a second die secured to said outer cylinder so as to receive therein said smallest diameter portion and to engage said second transition portion of the shaft, said first and second dies cooperating with said shaft such that said shaft is pushed through said dies by shock energy applied to the ends of said shaft and said outer cylinder, said dies being axially spaced from each other so as to withstand the bending moment applied to said device and to align said shaft and said outer cylinder while said shaft is forced through said die, said shaft having an effective cross sectional area at each die location, said first and second cross sectional areas being determined such that the initial contracting load is substantially one-third the produce of the effective cross sectional areas and the yielding stress of the material of the shaft having contraction ratios of $$\left(\frac{D_1-D_2}{D_1} \text{ and } \frac{D_2-D_3}{D_2}\right)$$

no greater than approximately ten percent, whereby a constant load displacement characteristic value is attained when said shaft is forced through said dies.

2. A shock absorbing device for absorbing shock energy by plastic deformation of at least one member of the device, comprising: a hollow shaft of substantially uniform thickness and having a reduced diameter portion ($D_2$), a larger diameter portion ($D_1$), and a gradually tapered transition portion between said reduced and larger diameter portions, said shaft being of a material with a predetermined yielding stress such that a contraction ratio $$\left(\frac{D_1-D_2}{D_1}\right)$$

is no greater than ten percent, an outer cylinder axially aligned with said shaft and movably connected longitudinally to said shaft, at least one die secured to one end of said outer cylinder so as to receive therein said reduced diameter portion of the shaft, said larger diameter portion of said shaft having a substantially uniform cross sectional area and said shaft having a predetermined effective cross sectional area to effect an initial contracting load substantially equal to one-third the product of said yielding stress and said effective cross sectional area, a stepped portion of the shaft integrally formed in one end of the reduced diameter portion, a smallest diameter portion of the shaft formed by said stepped portion, said die secured to one end of said outer cylinder so as to engage an outer surface of said transition portion of the shaft; a plurality of circumferentially uniformly spaced openings disposed in the outer cylinder overlying said smallest diameter portion of the shaft, plastic material filled into a space between the overlying outer cylinder portion and the outer surface of said smallest diameter portion, whereby said plastic material overflows from said openings and hardens in place after said shaft is inserted into said outer cylinder, said plastic material acting as means to prevent bending and relative displacement of the assembled shock absorbing device and means to initially guide a shock absorbing stroke, said openings being sufficiently small to allow shear off of said overflow plastic material without adverse resistance effect to the shock absorbing process, whereby a constant load displacement characteristic value is attained when said shaft is forced through said die.

3. A shock absorbing device for absorbing shock energy by plastic deformation of at least one member of the device, comprising: a hollow shaft of substantially uniform thickness and having a reduced diameter portion ($D_2$), a larger diameter portion ($D_1$), and a gradually tapered transition portion between said reduced and larger diameter portions, said shaft being of a material with a predetermined yielding stress such that a contraction ratio $$\left(\frac{D_1-D_2}{D_1}\right)$$

is no greater than ten percent, an outer cylinder axially aligned with said shaft and movably connected longitudinally to said shaft, at least one die secured to one end of said outer cylinder so as to receive therein said reduced diameter portion and to engage said transition portion of the shaft, said die comprising a plurality of regularly circumferentially spaced notched portions on its inner surface to irregularly deform said shaft when said shaft is forced through said die, said larger diameter portion of said shaft having a substantially uniform cross sectional area, and said shaft having a predetermined effective cross sectional area to effect an initial contracting load which substantially equals one-third the product of said yielding stress and said effective cross sectional area, whereby a constant load displacement characteristic value is attained when said shaft is forced through said die.

4. A shock absorbing device for absorbing shock energy by plastic deformation of at least one member of the device, comprising: a hollow shaft of substantially uniform thickness and having a reduced diameter portion ($D_2$), a larger diameter portion ($D_1$), and a gradually tapered transition portion between said reduced and larger diameter portions, said shaft being of a material with a predetermined yielding stress such that a contraction ratio $$\left(\frac{D_1-D_2}{D_1}\right)$$

is no greater than ten percent, an outer cylinder axially aligned with said shaft and movably connected longitudinally to said shaft, at least one die secured to one end of said outer cylinder so as to receive therein said reduced diameter portion and to engage said transition portion of the shaft, said larger diameter portion of said shaft having a substantially uniform cross sectional area, said shaft having a predetermined effective cross sectional area to effect an initial contracting load which substantially equals one-third the product of said yielding stress and said effective cross sectional area, and further a plurality of radially circumferentially spaced punch means being applied to the outer surface of said outer cylinder to deform portions of said cylinder into engagement with said reduced diameter portion of said shaft to prevent relative movement between said cylinder and said shaft, whereby a constant load displacement characteristic value is attained when said shaft is forced through said die.

5. A safe steering assembly for a vehicle to absorb shock energy by plastic deformation of a portion thereof, comprising: a steering column shaft means including an upper and a lower steering column shaft axially slidably engaging each other, a steering wheel secured to the upper end of said upper column shaft, steering gear means connected to the lower end of the lower steering column, a jacket tube rotatably supporting said steering column shaft means, support means being secured to the vehicle body and axially slidably supporting said jacket tube, abutting means being secured to the jacket tube to prevent axial displacement of the jacket tube relative to the steering wheel by abutting an adjacent side surface of the supporting means; a shock absorbing device secured to the lower end of the jacket tube including: a hollow shaft attached to the vehicle body and having a substantially uniform thickness, a reduced diameter portion of said shaft ($D_2$), a larger diameter portion ($D_1$) on said shaft, a gradually tapered transition portion between said reduced and larger diameter portions, said shaft being of a material with a predetermined yielding stress such that a contraction ratio $$\left(\frac{D_1-D_2}{D_1}\right)$$

is no greater than approximately ten percent, an outer cylinder axially aligned with said shaft and movably mounted longitudinally on said shaft, a die secured to one end of said outer cylinder so as to engage said transition portion of the shaft, said outer cylinder being secured to the jacket tube, said larger diameter portion of said shaft having a substantially uniform cross sectional area, whereby a constant load displacement characteristic value is attained when said shaft is pushed through said die, said shaft having a predetermined effective cross sectional area, whereby an initial contracting load is substantially one-third the product of said yielding stress and said effective cross sectional area, wherein shock energy caused by an operator's body is absorbed by plastic deformation of said shaft and any destructive force applied from a lower end of said shaft is prevented from damaging an upper portion of the steering assembly.

6. A steering assembly as defined in claim 5 wherein guide means engage said shaft and are positioned between said outer cylinder and said reduced diameter portion of the shaft, said guide means spaced from said die in an axial direction so as to stand bending moment applied to said device and to align said shaft and said outer cylinder.

7. A steering assembly defined in claim 5 further comprising: a smallest diameter portion on the shaft, a gradually tapered second transition portion, a second die secured to said outer cylinder engaging said smallest diameter portion and an outer surface of said second transition portion, whereby said shock absorbing device is aligned and prevented from bending and said shaft is successively reduced by said dies.

8. Shock absorbing device for absorbing shock energy by plastic deformation as in claim 5 further comprising: a stepped portion of the shaft integrally formed in one end of the reduced diameter portion, a smallest diameter portion of the shaft formed by said stepped portion, said die secured to one end of said outer cylinder so as to engage an outer surface of said transition portion of the shaft; a plurality of circumferentially uniformly spaced openings disposed in the outer cylinder overlying said smallest diameter portion of the shaft, plastic material filled into a space between the overlying outer cylinder portion and the outer surface of said smallest diameter portion, whereby said plastic material overflows from said openings and hardens in place after said shaft is inserted into said outer cylinder, said plastic material acting as means to prevent bending and relative displacement of the assembled shock absorbing device and means to initially guide a shock absorbing stroke, said openings being sufficiently small to allow shearing of said overflow plastic material without adverse resistance effect to the shock absorbing process.

9. A shock absorbing device as defined in claim 5 wherein said die comprises a plurality of regularly circumferentially spaced notched portions on its inner surface, whereby said shaft is irregularly deformed when said shaft is forced through said die.

10. A shock absorbing device as defined in claim 5 wherein a plurality of radially circumferentially spaced punched means are applied to the outer surface of said outer cylinder to deform portions of said cylinder into engagement with said reduced diameter portion of said shaft, whereby relative movement is prevented between said cylinder and said shaft.

11. A shock absorbing device for a vehicle to be provided between a bumper means and a vehicle body for absorbing shock energy by plastic deformation of at least one member of the device, comprising: a hollow shaft of substantially uniform thickness and having a reduced diameter portion of $D_2$, a larger diameter portion of $D_1$ and a gradually tapered transition portion between said reduced and larger diameter portions, an outer cylinder axially aligned with said shaft, a die secured to one end of said outer cylinder to receive therein said reduced portion and to engage said transition portion of said shaft to be pushed through said die by shock energy applied to opposed ends of said shaft and said outer cylinder, a guide means provided between the outer surface of said reduced diameter portion of the shaft and the inner surface of said outer cylinder, said guide means being spaced from said die in the axial direction thereby resisting any bending moment applied to said device and aligning said shaft and said outer cylinder while said shaft is forced through said die, a plate means secured to said bumper means, one of said opposed ends of said shaft and said outer cylinder being secured to said plate, the other of said opposed ends secured to a rigid portion of the vehicle, said shaft being of a material with a predetermined yielding stress such that a contraction ratio $$\left(\frac{D_1-D_2}{D_1}\right)$$

is no greater than approximately ten percent, said larger diameter portion of said shaft having a substantially uniform cross sectional area whereby a constant load displacement characteristic value is attained when said shaft is forced through said die, said shaft having a predetermined effective cross sectional area, whereby an initial contracting load is substantially one-third the product of said yielding stress and said effective cross sectional area.

12. A shock absorbing device as defined in claim 11 wherein said guide means is a second die having a smaller inside diameter than that of the first mentioned die, a smallest diameter portion on said shaft, a gradually tapered second transition portion on said shaft between said smallest and reduced diameter portions, said second transition portion engaging the inside surface of said second die, whereby said shaft is aligned and prevented from bending and reduced at two stages by said dies when a shock energy is applied thereto.

References Cited

UNITED STATES PATENTS

| | | |
|---|---|---|
| 2,682,931 | 7/1954 | Young. |
| 3,059,966 | 10/1962 | Spielman. |
| 3,181,821 | 5/1965 | Eddins. |
| 3,262,332 | 7/1966 | Wight. |
| 3,354,990 | 11/1967 | Stahl. |
| 3,369,634 | 2/1968 | Mazelsky. |
| 3,373,629 | 3/1968 | Wight et al. |

DUANE A. REGER, Primary Examiner

U.S. Cl. X.R.

74—492; 293—70